United States Patent

Bodelin et al.

[11] Patent Number: 5,779,754
[45] Date of Patent: Jul. 14, 1998

[54] PROCESS AND HORSESHOE FLAME FURNANCE FOR THE MELTING OF GLASS

[75] Inventors: Pierre Bodelin, Vanves; Patrick Recourt, Marcoussis, both of France

[73] Assignees: L'Air Liquide Societe Anonyme pour l'Etude et l'Exploitation des Procedes Georges Claude, Paris; Verrerie, Cristallerie d'Arques, J.G. Durand & Cie, Arques, both of France

[21] Appl. No.: 677,664
[22] Filed: Jul. 8, 1996

[30] Foreign Application Priority Data

Jul. 6, 1995 [FR] France .................. 95 08171

[51] Int. Cl.⁶ .................. C03B 5/235
[52] U.S. Cl. .................. 65/134.4; 65/135.1; 65/157; 65/335; 65/346; 65/347
[58] Field of Search .................. 65/32.5, 134.4, 65/135.1, 136.3, 157, 338, 346, 347

[56] References Cited

U.S. PATENT DOCUMENTS

| | | | |
|---|---|---|---|
| 3,592,623 | 7/1971 | Shepherd | 65/134.4 |
| 4,473,388 | 9/1984 | Lauwers | 65/134.4 |
| 4,531,960 | 7/1985 | Desprez | 65/134.4 |
| 4,911,744 | 3/1990 | Petersson et al. | 65/134.4 |
| 5,116,399 | 5/1992 | Lauwers | 65/135.1 |
| 5,158,590 | 10/1992 | Jouvard et al. | 65/134.4 |

FOREIGN PATENT DOCUMENTS

| | | |
|---|---|---|
| 335728 | 10/1989 | European Pat. Off. . |
| 90/12760 | 11/1990 | European Pat. Off. . |
| 447300 | 9/1991 | European Pat. Off. . |

Primary Examiner—Donald E. Czaja
Assistant Examiner—Sean Vincent
Attorney, Agent, or Firm—Burns, Doane, Swecker & Mathis, LLP

[57] ABSTRACT

A process for melting glass in a horseshoe-flame furnace including a rear, a forward and a lateral wall and a longitudinal axis comprising the steps of: introducing a charge into a region of the rear wall of the furnace; running the charge, in succession in a longitudinal direction, through a melting zone to completely melt the charge and form a glass bath, through a homogenization zone and then through a refining zone; evacuating the melted and refined glass into a region of the forward wall of the furnace; sending an air-fuel flame from a first region in the rear wall which is staggered with respect to the longitudinal axis of the furnace, evacuating smoke from a second region of that same rear wall essentially symmetrically to the first region with respect to the axis; periodically alternating the first and second regions; and sending at least one oxidized fuel flame above the refining zone from a point on the lateral wall adjacent to the second region which is situated opposite the refining zone.

20 Claims, 1 Drawing Sheet

PROCESS AND HORSESHOE FLAME FURNACE FOR THE MELTING OF GLASS

BACKGROUND OF THE INVENTION

This invention relates to the melting of glass in horseshoe-flame furnaces. More particularly, its first object is a glass-melting process in a horseshoe-flame furnace of the type where:

- the charge is introduced into the region of a rear wall of the furnace, it is successively caused, in the longitudinal direction of the furnace, to run through a melting zone and then, after the charge has been fully melted, through a homogenization zone and then a refining zone, and the melted and refined glass is evacuated into the region of the forward wall of the furnace;
- an air-fuel flame is sent from a first region of the rear wall, staggered with respect to the longitudinal axis of the furnace, and the smoke is evacuated from a second region of that same rear wall that is essentially symmetrical to the first with respect to said axis; and
- said first and second regions are periodically alternated.

SUMMARY AND OBJECTS OF THE INVENTION

The object of the invention is to make it possible to reduce emissions of nitrogen oxide ($NO_x$) by this type of furnace, without reducing the quantity or the quality of the glass produced by the furnace.

To this end, the object of the invention is a process of the above-mentioned type, characterized in that, furthermore, at least one oxy-fuel flame is sent above the refining zone, from a point on the lateral wall adjacent to said second region which is situated opposite this refining zone.

In this report, the word "oxygen" means air substantially enriched with oxygen and preferably oxygen having a purity of at least 90%, produced especially through air distillation, selective absorption, or selective permeation of air.

The process according to the invention may involve one or several of the following features:

- a second oxy-fuel flame is also sent above the refining zone from a second symmetrical point of said first point with respect to the longitudinal axis, the power of said second oxy-fuel flame being very much less than that of the first oxy-fuel flame and preferably at most equal to 25% of the latter;
- the total oxy-fuel power is very much less than the total air-fuel power and it is preferably on the order of 25% of the latter;
- one or each oxy-fuel flame is generated with oxygen speeds between 15 and 30 m/sec. approximately, and fuel speeds between 15 and 70 m/sec. approximately;
- the oxygen and fuel speeds are close to each other;
- one or each oxy-fuel flame is sent at an angle on the order of 0° to 20°, with respect to that which is perpendicular to the corresponding lateral wall, toward the rear wall of the furnace;
- one or each oxy-fuel flame is sent at an angle on the order of 20° down;
- one or each air-fuel flame is sent at about 0.3 to 0.8 meter and preferably about 0.35 to 0.4 meter above the glass bath;
- the air/fuel ratio of one or each air-fuel flame is reduced with respect to the normal ratio corresponding to the nature of treated glass;
- one or each oxy-fuel flame is super-stoichiometric;
- one or each oxy-fuel flame is stoichiometric and, furthermore, a jet of oxygen is sent above the refining zone, from a point on the corresponding wall situated a little below the point of injection of the corresponding oxy-fuel flame.

The object of the invention is also a horseshoe-flame furnace for glass melting intended for the employment of such a process. This furnace is of the type comprising the following: means for the introduction of a charge into the region of the rear wall of the furnace; means for, in succession, running the charge, in the longitudinal sense of the furnace, through a melting zone, a homogenization zone, and then a refining zone; means for evacuating the melted and refined glass in the region of the forward wall of the furnace; symmetrically, on either side of the longitudinal axis of the furnace, at least one air-fuel burner and one smoke evacuation opening; and means for alternating the operation of these burners, is characterized in that it comprises furthermore, in each lateral wall and opposite the refining zone, an oxy-fuel burner oriented so as to send an oxy-fuel flame above this refining zone.

DETAILED DESCRIPTION OF PREFERRED EMBODIMENTS

Examples of the implementation of the invention will now be described with respect to the attached drawing.

Figure 1:
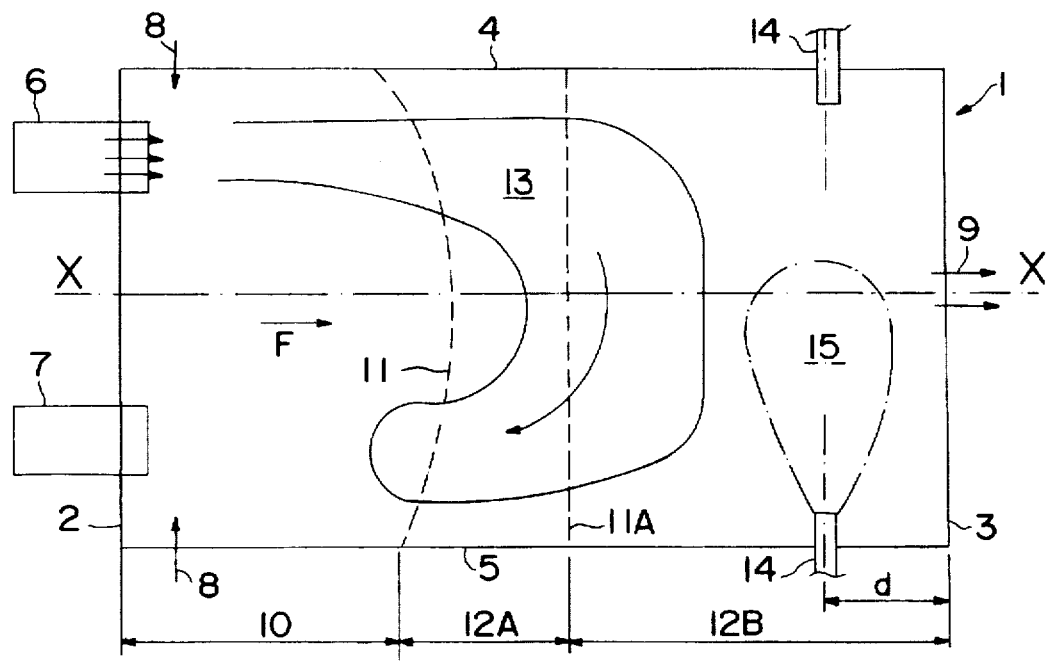
FIG. 1 schematically shows, in a plan view, a horseshoe-flame furnace in accordance with the invention.

Horseshoe-flame furnace 1, shown schematically in FIG. 1, has a generally rectangular shape with a longitudinal X—X axis, with two small sides that form a rear wall 2 and a forward wall 3, and two long sides that form left lateral wall 4 and right lateral wall 5, looking in the direction of circulation F of the charge.

In wall 2, on either side of the X—X axis and symmetrically with respect to the latter, the furnace comprises, on the one hand, a group of air-fuel burners 6, and, on the other hand, a smoke outlet opening 7, forming a regenerator. The furnace also comprises means 8 for the introduction of the charge to be melted in the vicinity of wall 2 and means 9 for the output of the liquid glass, produced in region 1 of wall 3.

All elements described so far are conventional and define a horseshoe-flame furnace. They therefore need not be detailed any further. When in operation, the charge is introduced via means 8 and circulates generally in direction F. In a first zone 10, called the melting zone, the charge is progressively melted entirely. Then, between boundary 11 of zone 10, which, in a plan view, has a shape that is more or less curved forward, and another boundary 11A, situated further forward, the melted charge runs through a homogenization zone 12A. Finally, the melted glass is refined between boundary 11A and forward wall 3. The corresponding zone 12B is the refining zone.

The heat energy is provided in the following manner.

On the one hand, in the conventional way, one of the two groups of burners 6 (the left-hand group in FIG. 1) sends an air-fuel flame 13 parallel to the X—X axis. This flame extends essentially along a straight line since its hot gases rise and curve in U-fashion in order then, on the other side of the X—X axis, to head toward opening 13 that is in service, through which the fumes are evacuated. The hot gases from the flame clearly cover the above-mentioned boundary 11A, as illustrated. The two groups of burners 6 are switched alternately at predetermined time intervals.

On the other hand, at a relatively short distance d from wall 3, the furnace has—symmetrically with respect to the X—X axis—two oxy-fuel burners 14, situated opposite zone 12. The distance d, for example, is about 1 meter, for a total furnace length on the order of 7 meters and a total heating power on the order of 3,500 kW; this corresponds to lengths on the order of 2 to 3 meters, along the X—X axis, for each of zones 10, 12A, and 12B. These burners 14 are switched opposite burner 6. For example, in the situation illustrated in FIG. 1, where the left-hand burners 6 are working, it is right-hand burner 14, located across wall 5, that is in operation.

Burners 14 are arranged so as to send an oxy-fuel flame above refining zone 12B, practically without direct interference with flame 13. For this purpose, these burners are arranged close to the surface of the bath or, if this is not possible, their axis is slightly declined downward, for example, at an angle on the order of 20°. The height of burners 14 is moreover determined so as to prevent the appearance of hot points on the surface of the glass. Generally speaking, thus, burners 14 are arranged about 0.3 to 0.8 meter and preferably 0.35 to 0.4 meter above the glass bath.

In a plan view, the axes of burners 14 are oriented to as to protect the forward wall of the furnace from any overheating. These axes can, in particular, run perpendicularly to the X—X axis, as shown, or they can be inclined slightly to the rear, for example, by an angle of about 10°.

About 80% of the total heating power is furnished by burners 6 and the remaining 20% are supplied by burner 14. Thus, compared to a conventional furnace equipped with burners 14, the power of burner 6 is reduced by about 20%, which further diminishes the flow rate of the smoke and thus the quantity of $NO_x$ that is emitted.

Moreover, due to the fact that the oxy-flame—whose temperature and partial oxygen pressure are high—is not placed in contact with large quantities of hot nitrogen, the heating power complement is not accompanied by the generation of large quantities of $NO_x$.

To optimize this phenomenon, it is advisable moreover to stagger the oxy-flame as much as possible, selecting fuel and oxygen speeds close to each other and rather low, typically between 15 and 30 m/sec.

In certain cases, where the air-flames, with high power, extend up to above the refining zone, it is advisable to increase the impulse of the fuel to rigidify the oxy-flame and to prevent it from being swept along excessively toward the rear of the furnace.

If the nature of the glass to be produced so permits, the generation of $NO_x$ can be further reduced by reducing the air/fuel ratio of the air burners 6, that is to say, by making them work with an oxygen deficit when compared to their normal operation, corresponding to the nature of the treated glass. The concentration of the $NO_x$ is then diminished, as is the temperature of the air flames, if burners 6 work in a sub-stoichiometric manner, that is to say, with an oxygen deficit when compared to the stoichiometry of the fuel reaction.

The oxygen deficit, typically between 10 and 30%, approximately, of the oxygen flow rate corresponding to operation without burners 14, can then be compensated for in two different ways.

If the glass is a little sensitive to the oxidizing character of the atmosphere that surmounts the refining zone, then the deficit oxygen is introduced directly into oxy-flame 15. Burners 14 then work in a super-stoichiometric manner, consequently, with a reduced flame temperature. The set-up is then very simple and is illustrated in FIG. 1. It should be noted that the oxygen excess preferably serves for the oxidation to $CO_2$ of CO, resulting from the sub-stoichiometric character of the aero-flames, to the detriment of the oxidation of the nitrogen in $NO_x$, whose reaction kinetics are much slower. In practice, the oxygen excess supplied to burners 14 is calculated to obtain, in the smoke, the same oxygen content as when operating without these burners, in other words, a lower content.

Figure 2:
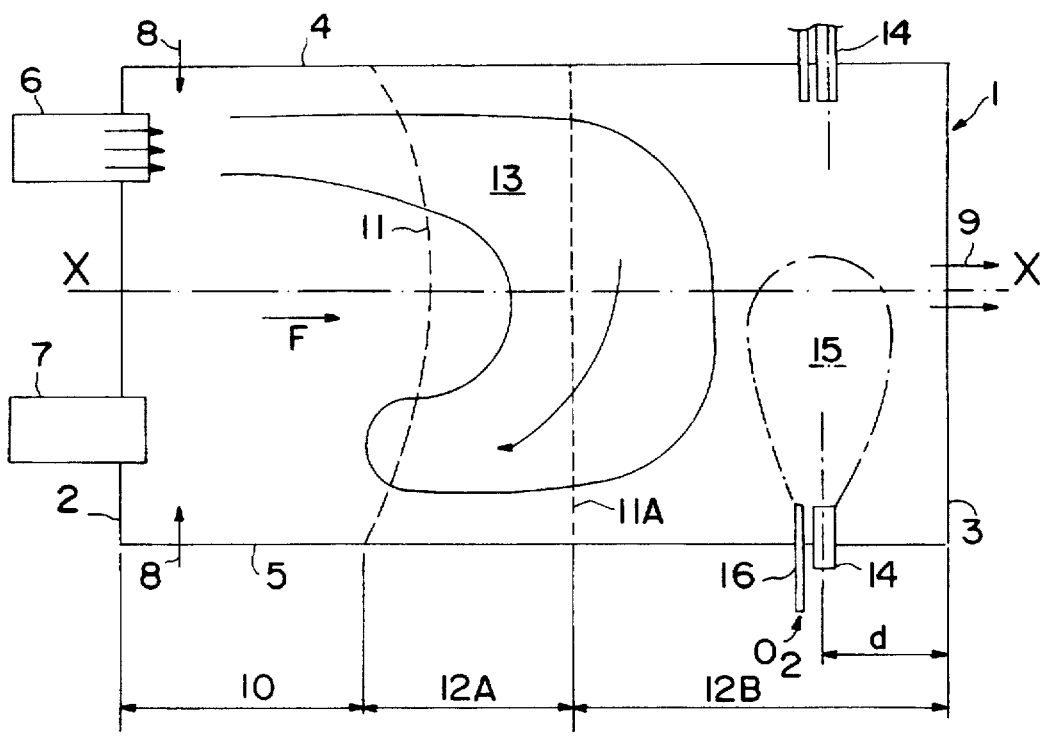
FIG. 2 is a similar view of a variant.

If, on the contrary, the glass is very sensitive to the oxidizing character of the atmosphere in the refining zone (extra-white glass, for example), burners 14 can be run in the stoichiometric mode, and all of the deficit oxygen is injected by means of oxygen nozzles 16 (FIG. 2), situated essentially below these burners 14 and oriented, for example, in the same manner.

To stagger this oxygen as much as possible above the bath, a low ejection speed is then selected near the above-mentioned values and the circulation speed of the flue glasses in the refining zone, in other words, about 10 to 30 m/sec.

In each case, it is also possible at the same time to operate burner 14, situated by the side of burners 6, which are in service, possibly with the associated oxygen nozzle 16. The corresponding energy is then at a maximum equal to about 25% of the energy of the opposite oxy-fuel assembly 14 or 14–16. This makes it possible to ensure the self-cooling of burner 14 in question, which, in the absence of a flame, would require the injection of a cooling air flow through said burner.

What is claimed is:

1. A process for melting glass in a horseshoe-flame furnace including a rear, a forward and a lateral wall and a longitudinal axis comprising the steps of:

introducing a charge into a region of the rear wall of the furnace;

running said charge, in succession in a longitudinal direction, through a melting zone to completely melt said charge and form a glass bath, through a homogenization zone and then through a refining zone;

evacuating the melted and refined glass into a region of the forward wall of the furnace;

sending an air-fuel flame from a first region in said rear wall which is staggered with respect to said longitudinal axis of the furnace, evacuating smoke from a second region of the rear wall essentially symmetrically to the first region with respect to said axis;

periodically alternating operation of said first and second regions; and sending at least one oxy-fuel flame contained above said refining zone from a point on the lateral wall adjacent to said second region which is situated opposite said refining zone.

2. The process according to claim 1, wherein said at least one oxy-fuel flame comprises a first and a second oxy-fuel flame, the process further comprising the step of sending said first oxy-fuel flame above the refining zone from a first point on the lateral wall, and sending said second oxy-fuel flame above the refining zone from a second point on the lateral wall, symmetrical with respect to said first point with respect to the longitudinal axis, said second oxy-fuel flame having a power which is substantially less than that of the first oxy-fuel flame.

3. The process according to claim 2 wherein the power of said second oxy-fuel flame is at most equal to 25% of the power of said first oxy-fuel flame.

4. The process according to claim 1 or 2 wherein the total oxy-fuel power is less than total air-fuel power.

5. The process according to claim 4, wherein the total oxy-fuel power is about 25% of the total air-fuel power.

6. The process according to claim 2, wherein one or both of said first and second oxy-fuel flames are generated with oxygen speeds of between approximately 15 and 30 m/sec, at fuel speeds between approximately 15 and 70 m/sec.

7. The process according to claim 6, wherein the speeds of oxygen and fuel are approximately equal.

8. The process according to claim 2, wherein one or both of said first and second oxy-fuel flames are sent at an angle of between about 0° and 20°, with respect to an angle perpendicular to a corresponding lateral wall, toward the rear wall of the furnace.

9. The process according to claim 8, wherein one or both oxy-fuel flames are sent at an angle of about 20° downward.

10. The process according to claim 1 wherein said air fuel flame is sent at about 0.3 to 0.8 meter above the glass bath.

11. The process according to claim 10, wherein said air fuel flame is sent at about 0.35 to 0.4 meter above the glass bath.

12. The process according to claim 1 wherein said air-fuel flame has an air/fuel ratio which is reduced with respect to a stoichiometric air/fuel ratio.

13. The process according to claim 12, wherein one or both oxy-fuel flames are super-stoichiometric with respect to oxygen.

14. The process according to claim 12, wherein one or both oxy-fuel flames are stoichiometric, said process further comprising sending an oxygen jet above the refining zone, from a point from a corresponding lateral wall which is situated slightly below the point for the injection of the corresponding oxy-fuel flame.

15. The process according to claim 1, wherein the oxy-fuel flame is generated with an oxygen speed of between approximately 15 and 30 m/sec, at a fuel speed between approximately 15 and 70 m/sec.

16. The process according to claim 1, wherein the oxy-fuel flame is sent at an angle of between about 0° and 20°, with respect to an angle perpendicular to a corresponding lateral wall, toward the rear wall of the furnace.

17. A horseshoe-flame furnace for glass melting including a rear, a forward and a lateral wall and a longitudinal axis, said furnace comprising;

means for introducing a charge into a region of the rear wall of the furnace;

means for running the charge in succession, in a longitudinal direction of the furnace, through a melting zone, a homogenization zone, and then a refining zone;

means for evacuating the melted and refined glass in a region of the forward wall of the furnace; symmetrically, on either side of the longitudinal axis of the furnace;

a first air-fuel burner for sending a first air-fuel flame from a first region of said rear wall which is staggered with respect to said longitudinal axis of said furnace, and a first flue evacuation opening for evacuating smoke from a second region of said rear wall essentially symmetric to said first region with respect to said axis when said air-fuel flame is sent from said first region;

a second air-fuel burner for sending a second air-fuel flame from said second region, and a second flue evacuation opening for evacuating smoke from said first region when said air-fuel flame is sent from said second region;

means for alternating operation of said first and second regions; and an oxy-fuel burner in each lateral wall and opposite the refining zone, oriented so as to send an oxy-fuel flame contained above said refining zone.

18. The horseshoe-flame furnace according to claim 17, further comprising, slightly below each oxy-fuel burner, an oxygen nozzle.

19. The horseshoe-flame furnace according to claim 17, further comprising a means for switching between the oxy-fuel burners so as to operate the oxy-fuel burner which is opposite the operating air-fuel burner.

20. The horseshoe-flame furnace according to claim 17, further comprising a means for operating the oxy-fuel burner, situated on a same side as the air-fuel burners that are in operation, with a power which is substantially less than that of said other oxy-fuel burner.

* * * * *